(12) United States Patent
Kondo et al.

(10) Patent No.: US 6,275,846 B1
(45) Date of Patent: Aug. 14, 2001

(54) MULTISERVER WORKFLOW SYSTEM

(75) Inventors: Takaaki Kondo; Tetsuya Watanabe; Hisashi Oono, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/198,336

(22) Filed: Nov. 24, 1998

(30) Foreign Application Priority Data

Nov. 28, 1997 (JP) .................................................... 9-343929

(51) Int. Cl.[7] ....................................................... G06F 15/16
(52) U.S. Cl. ............................ 709/200; 709/203; 709/227
(58) Field of Search ................................... 709/200, 203, 709/201, 219, 223, 227, 245, 232, 234, 235

(56) References Cited

U.S. PATENT DOCUMENTS

| | | | |
|---|---|---|---|
| 5,634,127 | * 5/1997 | Cloud et al. ......................... | 709/300 |
| 5,754,857 | * 5/1998 | Gadol ................................... | 709/300 |
| 5,774,667 | * 6/1998 | Garvey et al. ....................... | 709/222 |
| 5,867,824 | * 2/1999 | Saito et al. ............................. | 705/9 |
| 6,098,108 | * 8/2000 | Sridhar et al. ...................... | 709/239 |

* cited by examiner

*Primary Examiner*—Ario Etienne
(74) *Attorney, Agent, or Firm*—Antonelli, Terry, Stout & Kraus, LLP

(57) ABSTRACT

A multiserver workflow system in which each server and the users who use clients construct one subsystem includes: a plurality of servers; a plurality of clients; and a network to which the servers and the clients are connected. All of the servers have address information of the servers constructing all of the subsystems and correspondence information on all of the users and the subsystem which can be used by respective users. When each client connects to any one of the servers, the client downloads a list of the subsystems which can be used by the user who uses the client and addresses of the servers constructing the usable subsystems from the connection server and stores the list as a connectable server list.

17 Claims, 5 Drawing Sheets

MULTISERVER WORKFLOW SYSTEM

BACKGROUND OF THE INVENTION

1. Field of the Invention

The invention relates to a server/client system and, more particularly, to a multiserver workflow system comprising a plurality of subsystems.

2. Description of the Related Art

There is a process for circulating a document to concerned departments or concerned persons and obtaining approvals of those circulation destinations. A workflow system realizes such a process on a computer network. Specifically speaking, there is an example as disclosed in U.S. Pat. No. 5,634,127.

Generally, a server has business process definition information as definition information of a document flow (business process). The document (case) inputted by the user on a client is controlled in accordance with the definition information.

Hitherto, as a workflow system, there is a workflow system with a single server construction in which one server and a plurality of clients are connected via a network.

There is also a workflow system having a multiserver construction such that a plurality of servers and a plurality of clients are connected via a network and a control is made so that the plurality of servers have the same business process definition information and all of the plurality of servers have the newest status information of a case which is being processed.

There is also a workflow system having a multiserver construction such that a plurality of workflow systems each having the single server construction as mentioned above are connected to the same network.

In case of the conventional workflow system of the single server construction, since all of the businesses depend on one server, if the server causes a malfunction, all of the businesses are stopped. The number of businesses of which the server is in charge increases, a use frequency of the businesses rises, and a load which is applied to the server increases, so that a business executing speed decreases.

In case of the workflow system of the multiserver construction which holds the same information, an amount of information which is stored into each server increases and traffics among the servers for keeping the information identical among the servers occur. There is a case where unless the backup and restoring operations are executed in a lump in all of the servers, a mismatch among the servers occurs in the information recovered from the backup.

In case of the workflow system of the multiserver construction in which a plurality of workflow systems of the single server construction are connected to the same network, since the users cannot be collectively managed, the user management is troublesome. Further, when a change in construction (the number) of servers occurs, it is necessary to change information in all clients using the target system.

SUMMARY OF THE INVENTION

It is an object of the invention to provide a multiserver workflow system in which even when a server to be connected does not work, the client can try to connect with another server.

Another object of the invention is to provide a multiserver workflow system which can execute businesses on servers other than a fault occurring server.

Still another object of the invention is to make it easy to manage and change information on servers and users in a multiserver workflow system.

To accomplish those objects, a workflow system according to the invention has the following construction.

A multiserver workflow system in which each server and the users who use clients construct one subsystem comprises: a plurality of servers; a plurality of clients; and a network to which the servers and clients are connected. All of the servers have: address information of the servers belonging to all subsystems; and correspondence information of all users and the subsystems which can be used by the users. When each client is connected to any one of the servers, the client downloads a list of the subsystems which can be used by the user who use the client and addresses of the servers constructing the usable subsystem from the connecting server and stores them as a connectable server list for each login user.

Further, each client tries to connect to the server by using the stored connectable server list and, when the connection to the server fails, the client tries to connect to another server in the connectable server list.

DESCRIPTION OF THE PREFERRED EMBODIMENTS (1) System construction

Figure 1:
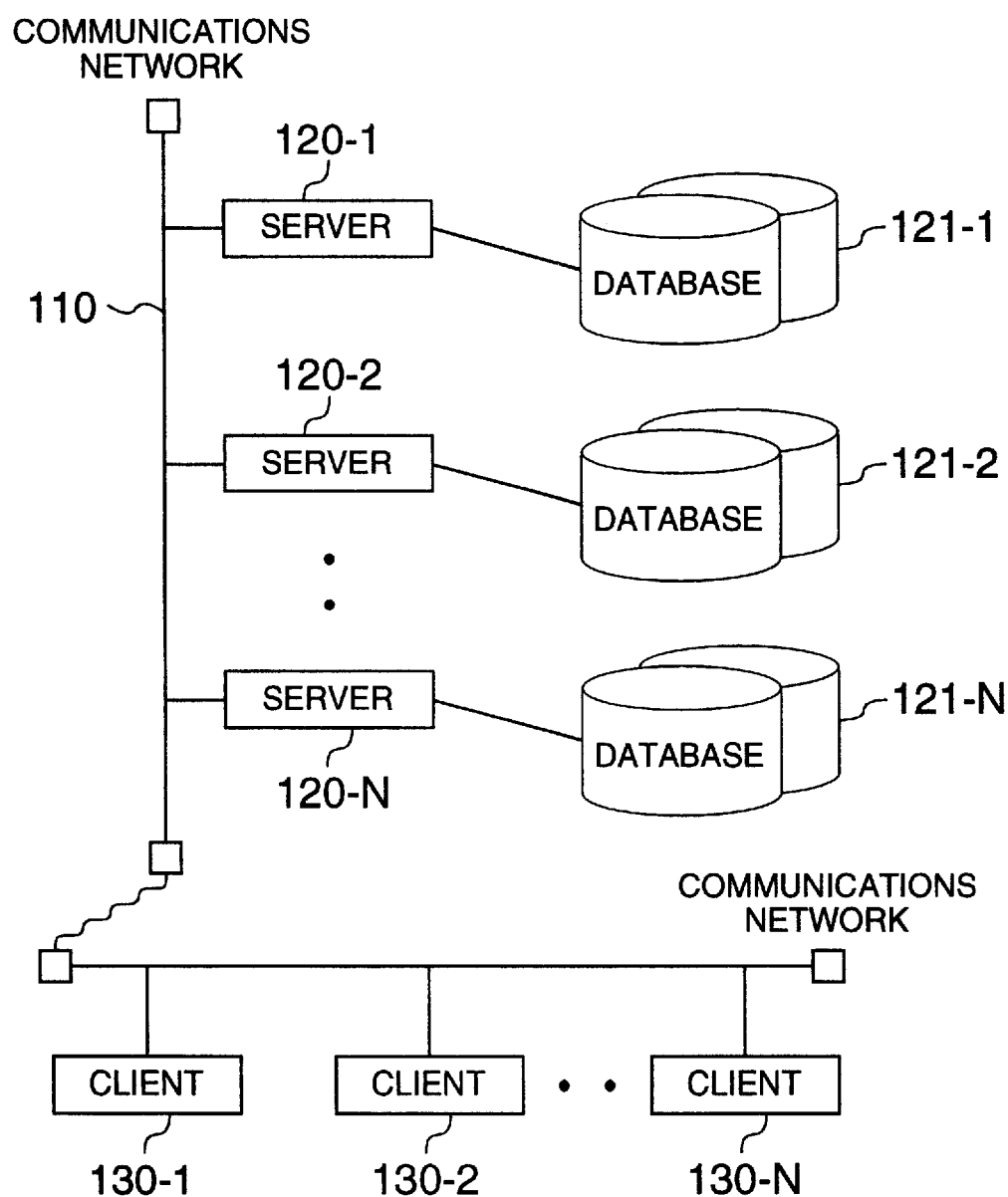
FIG. 1 is a block diagram showing an outline of a structure of a multiserver workflow system according to the invention.

FIG. 1 is a block diagram showing an outline of a construction of a multiserver workflow system.

A plurality of servers 120-1 to 120-N and a plurality of clients 130-1 to 130-N are connected to a communications network 110 and databases 121-1 to 121-N are connected to the respective servers.

The communications network 110 is an LAN (Local Area Network), a WAN (Wide Area Network), a public telephone line, an Internet, or the like. The server 120 and client 130 are computers such as personal computers, workstations, or the like each having a CPU, a memory, input/output devices, and an interface to the communications network. The database 121 can be also included in the server 120. Communications between the server 120 and client 130 and between the servers are executed using a protocol depending on the communications network 110, for example, TCP/IP. One server and a plurality of users who use the clients construct one subsystem.

(2) Operation of the user

Figure 2:
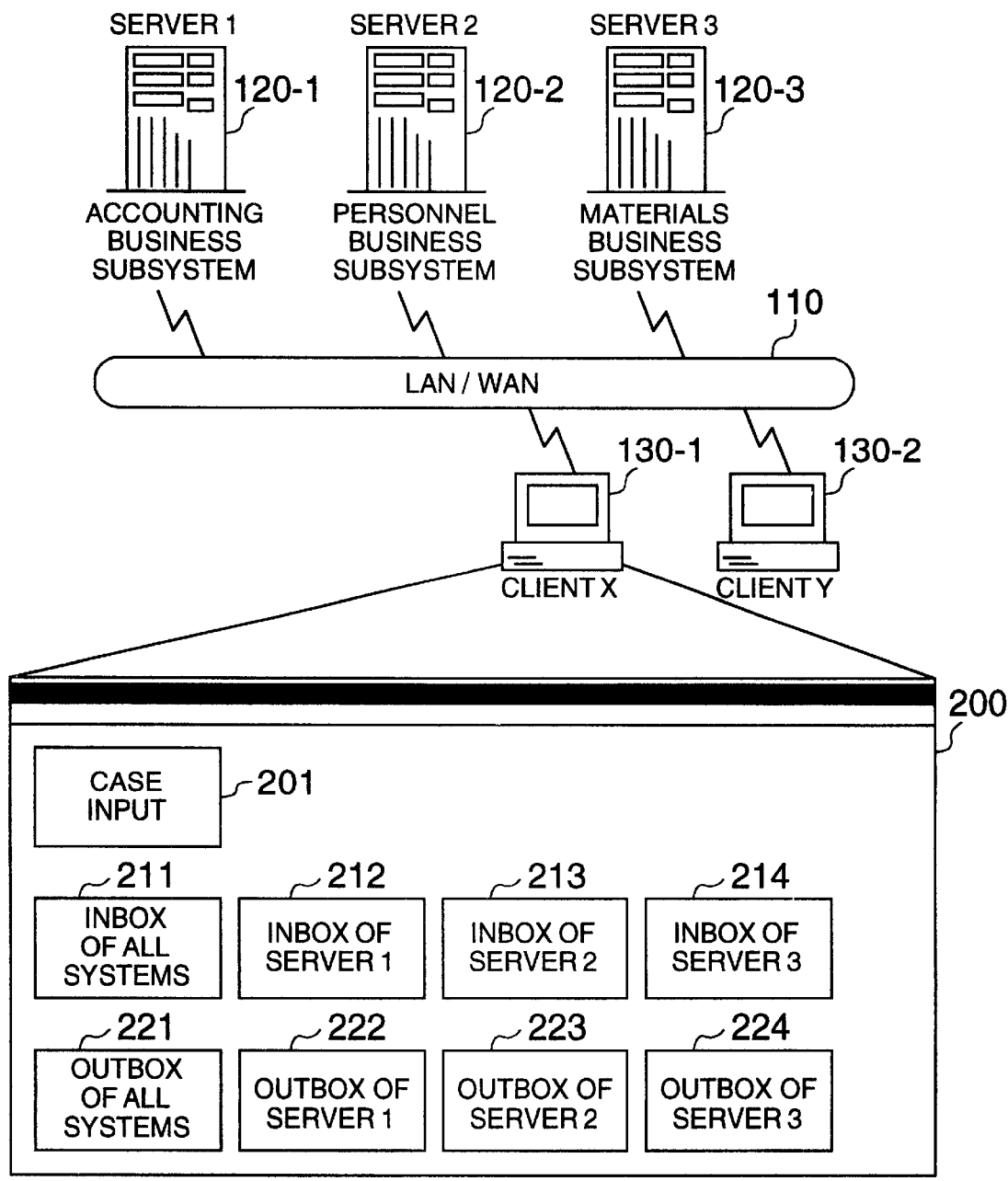
FIG. 2 is a block diagram showing a more specific structual example of the multiserver workflow system and a user interface on a client.

FIG. 2 is a block diagram showing a more specific structural example of the multiserver workflow system and a user interface on the client.

In this example, server 1 (120-1), server 2 (120-2), and server 3 (120-3) are connected as servers to the network (110). The server 1 belongs to an accounting business subsystem. The server 2 belongs to a personnel business subsystem. The server 3 belongs to a materials business subsystem.

It is now assumed that a user who uses a client X (130-1) is permitted to use all of the subsystems. A basic screen 200 is displayed on a display device of the client X.

Buttons of case input 201, INBOXes 211 to 214, and OUTBOXes 221 to 224 are displayed on the basic screen 200.

In case of inputting a new case, the user selects the case input button 201 by a mouse click or the like. After that, a list of subsystems which can be used by the user is shown. By further selecting a desired subsystem, a business process in the selected subsystem is displayed. The subsequent operation is the same as that of the conventional workflow system of the single server construction.

The user selects the INBOX button in order to access a case which is not processed yet and has to be processed from now on. The user selects the OUTBOX button in order to see a status of a case which has already been inputted or processed. When the user selects the INBOX and OUTBOX buttons (211, 221) of all of the systems, titles of the cases relating to the user in all of the subsystems are displayed together with the additional information. When the user selects the INBOX and OUTBOX buttons (212–214, 222–224) of each system, a title of the cases relating to the user in the selected subsystem are displayed together with the additional information.

When the INBOX button is selected, a person who made the case, making time, a name of the using business process, time when the case arrived at his INBOX, and the like are displayed together with the case title. By selecting the case title, the user performs the referring or approving operation of the contents of the case. When the user selects the OUTBOX button, a person who made the case, making time, a name of the using business process, a processing status, and the like are displayed together with the case title. The operation after the user accessed each subsystem is the same as that of the conventional workflow system of the single server construction.

(3) Information making and setting method

Figure 3:
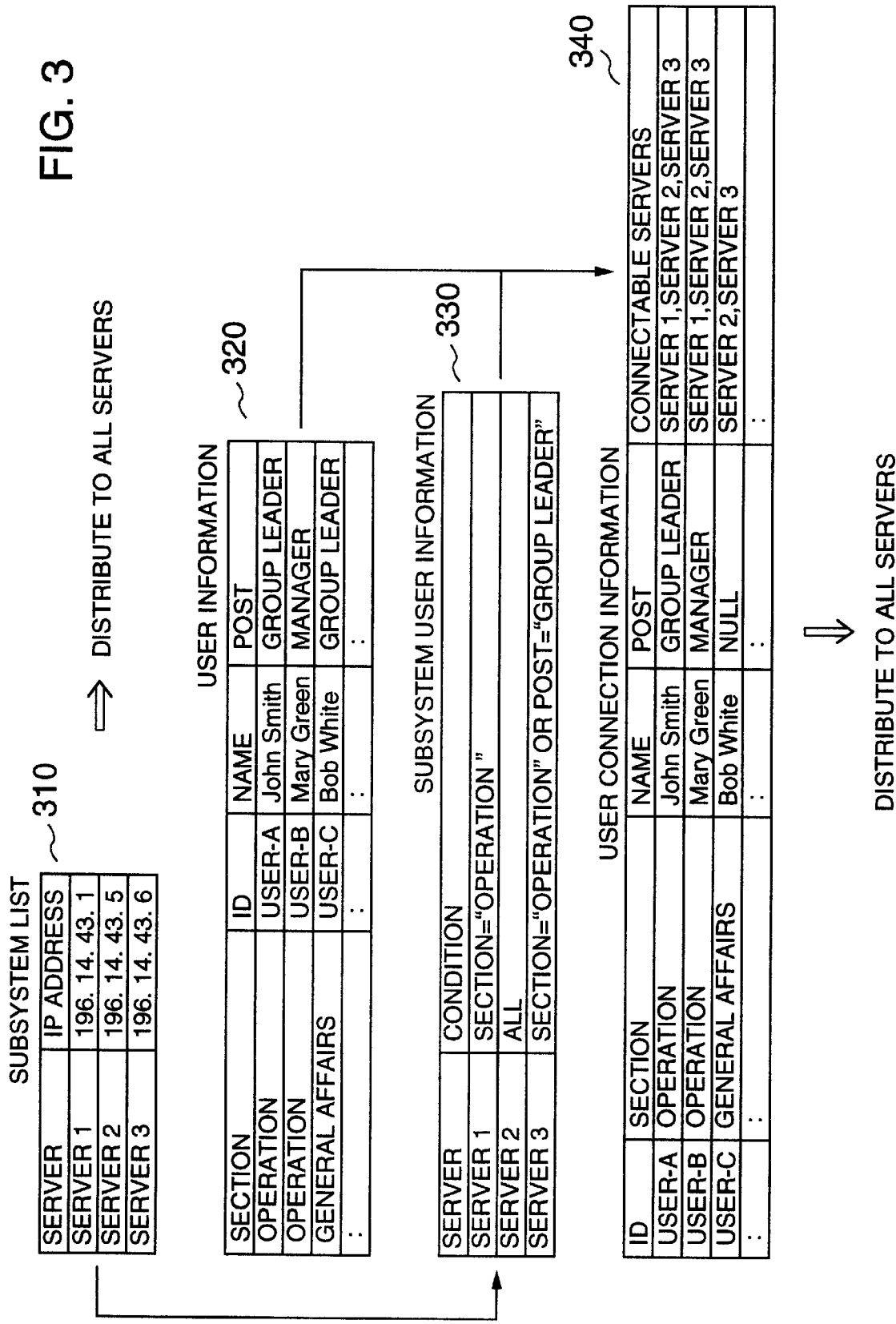
FIG. 3 is a diagram for explaining structures of information which is formed by a management server and information which is distributed to each subsystem and for explaining the information forming method.

FIG. 3 is a diagram for explaining information which is distributed to the servers of each subsystem.

The information is made by one server and the information is distributed to each server. To make the information, a dedicated server may be provided or any one of the servers 1, 2, and 3 constructing the business subsystems as shown in FIG. 2 may be used. The server which makes the information to be distributed to each server is called a management server.

The information is made in the management server by the following procedure.

① Making of the subsystem list

A managing program on the management server makes a subsystem list table 310 in accordance with the input of a manager and stores the table into a memory in the management server. The subsystem list table 310 includes a name of the server constructing each subsystem and an address (for example, IP address) on the communications network of the server.

② Making of the user information

The managing program on the management server makes a user information table 320 in accordance with the input of the manager and stores the table into the memory in the management server. The user informationtable 320 includes user IDs of all of the users who use the system, sections to which they belong, names, and posts. The table 320 can also further include items such as passwords, nicknames, and the like. The user information table may be made by the server of each subsystem and collected to the management server.

③ Making of the subsystem user information

The managing program on the management server makes a subsystem user information table 330 in accordance with the input of the manager and on the basis of the subsystem list table 310 and stores the table into the memory in the management server. The manager designates the users who use each subsystem by indicating a condition. For example, as shown in the table 330 in FIG. 3, the users in an operation section are designated for the subsystem of the server 1. All of the users are designated for the subsystem of the server 2. The users in the operation section and group leaders of all sections are designated for the subsystem of the server 3. The table 330 includes the server names and inputted conditions.

④ Making of the User Connection Information

The managing program on the management server compares the items in the user information table 320 which has already been made with the conditions in the subsystem user information table 330, determines the connectable servers for respective users, and makes a user connection information table 340. The user connection information has a list of the connectable servers in addition to the same items as those in the user information table 330.

⑤ Distribution of the subsystem list and the user connection information

The managing program on the management server distributes the subsystem list table 310 and the user connection information table 340 to all of the servers via the communications network. Therefore, all of the servers 1 to 3 have the same information.

The managing program is software which is executed by the CPU of the management server.

⑥ Distribution of the connectable server list to each client

Figure 4:
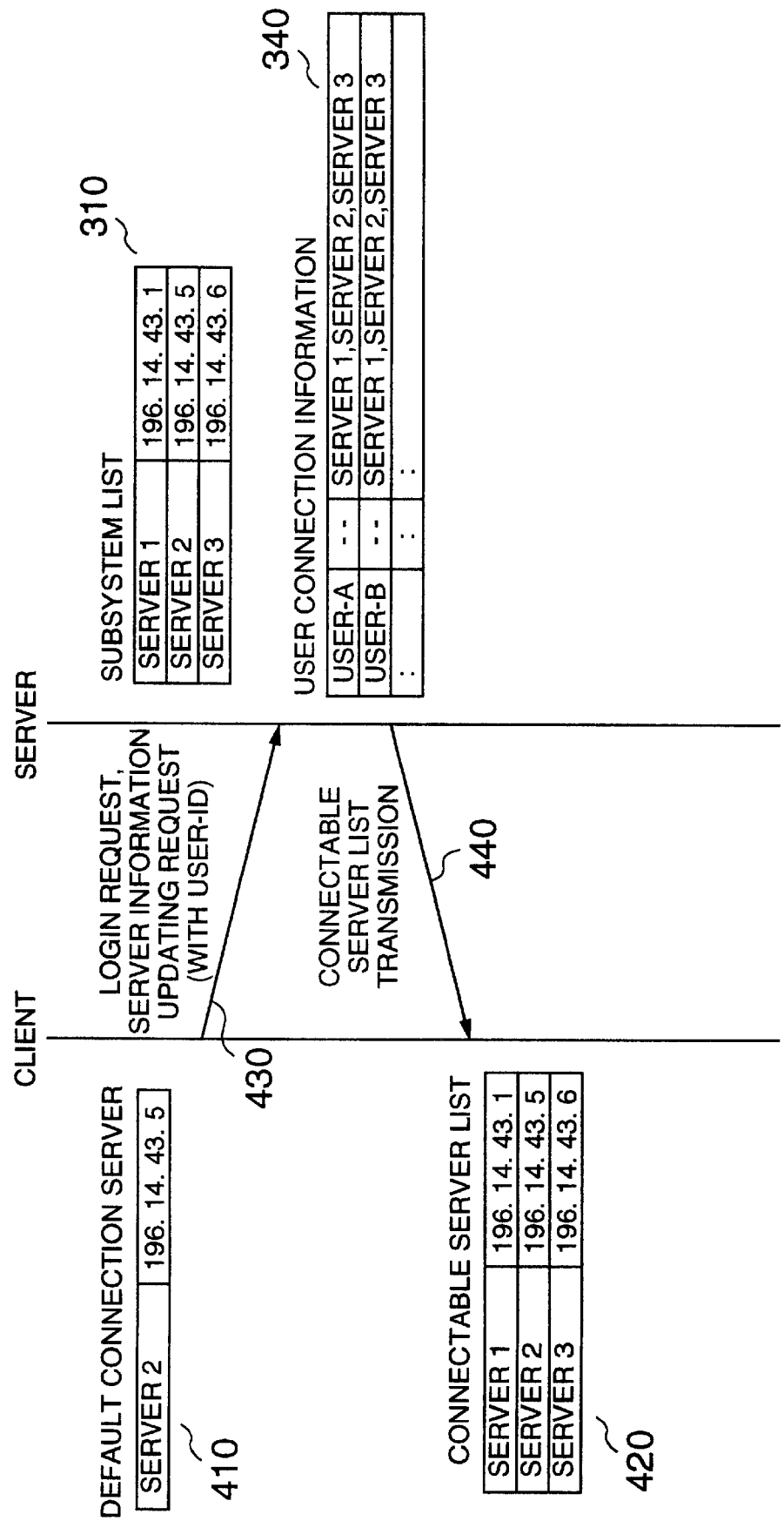
FIG. 4 is a diagram for explaining a method of distributing a connectable server list from a server to clients.

A method of distributing the connectable server list from the server to each client will now be described by using FIG. 4.

For each client, the server to be connected in default is determined and the client has its address as default connection server information 410. The client connects to the default connection server and transmits a login request (430) to the connection server together with the user ID of the user who uses the client. The client can transmit a server information updating request or a login request to the server being connected together with the user ID at another arbitrary timings.

When the login request or server information updating request is received, the server extracts the user ID included in those requests. The server extracts the connectable server names of the user ID from the user connection information table 340 and, further, extracts the addresses of the connectable servers from the subsystem list table 310. After that, the server transmits the connectable server names and the addresses as a connectable server list to a sending source of the login request or the server information updating request (440). The client stores the received connectable server list as a table 420. In some systems, a plurality of users share one client. In such system, the client may store the connectable server lists for the respective users.

The foregoing procedure of ① to ⑥ is also applied to the cases of an addition of the server, an address change of the server, an addition or deletion of the user, and a change in user information.

(4) Process of the client

Figure 5:
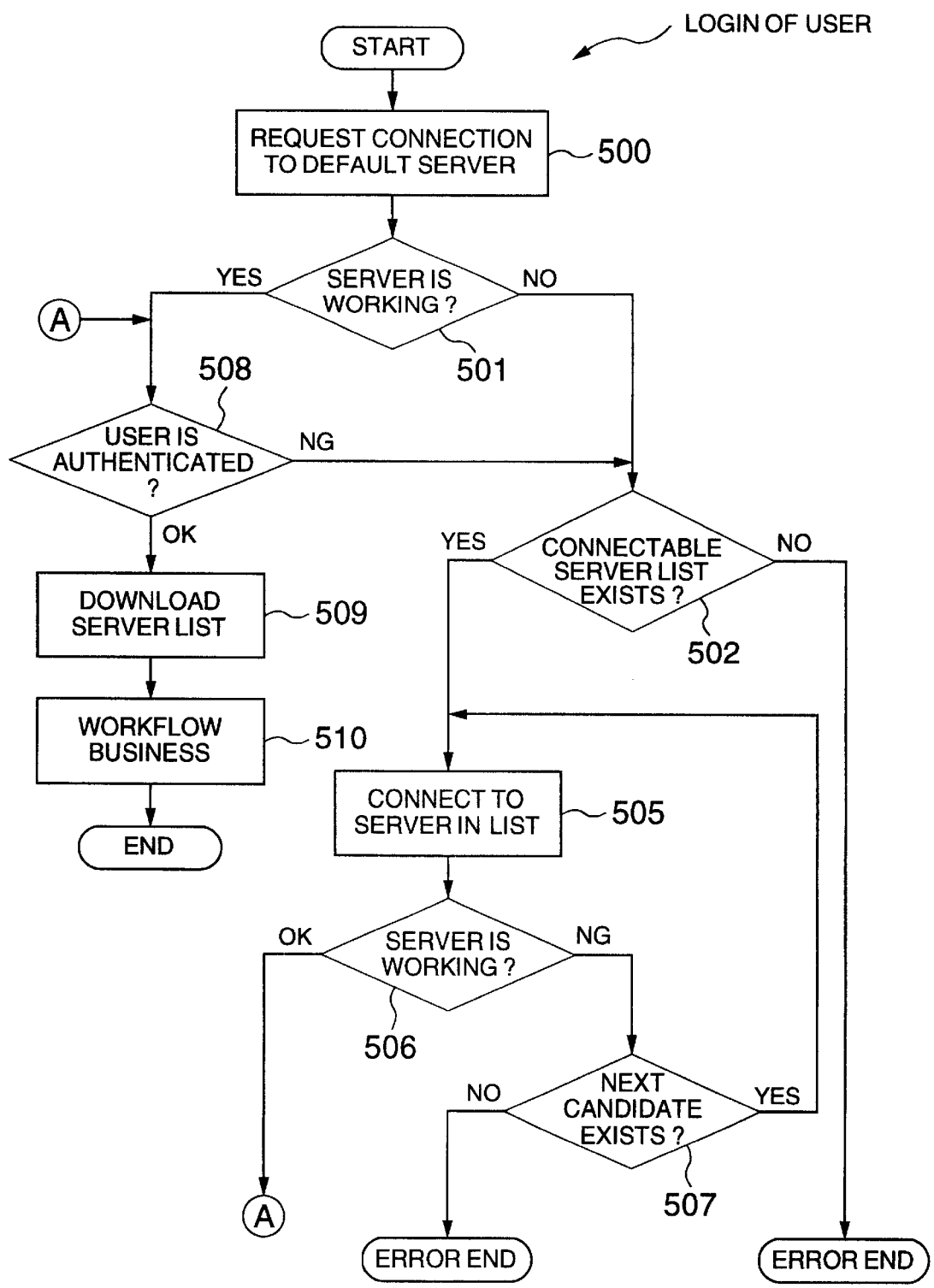
FIG. 5 is a diagram for explaining processes when a client connects to a server.

Process of the client when the user starts a workflow business in the client device will now be described with reference to FIG. 5.

When the client receives the login request from the user, the client obtains information on the server which has previously been designated as a default server on own client machine (step 500) and tries to connect to the default server.

When the connection tried server is working (YES in step 501) and the user is authenticated by the server (OK in step 508), the connectable server list table 420 is downloaded onto the own client machine (step 509). Even when the server list has already existed on the client, by again downloading, the client can obtain the new connectable server list corresponding to the login user. After that, the client starts the workflow business (step 510).

When the connection tried server is not working (NO in step 501) or the user fails to be authenticated by the server (NG in step 508), the client checks whether the connectable server list table 420 for the user exists on the own client machine or not (step 502).

When the table 420 exists (YES in step 502), the client tries to connect to one of the servers in the list (step 505).

When the connection cannot be performed (NG in step 506) due to a reason such that the connection tried server is in a down state or the like, the client checks if another server exists in the list (step 507). When there is another server (YES in step 507), the client tries to connect to the server (step 505).

When the client cannot connect to all servers in the list (NO in step 507), the client finishes the processes.

When the connection tried server is working (OK in step 506) and the user is authenticated by the server (OK in step 508), the connectable server list table 420 is downloaded onto the own client machine (step 509).

When the table 420 for the user doesn't exist, the client finishes the processes (NO in step 502).

The above process is realized by software which is executed by the CPU of the client.

The order of selecting the connection trying server in the server list table 420 by the client can be determined by the client or can be merely the topdown order of in the table.

The basic screen 200 which is displayed on the display device of the client is shown in the paragraph (2) mentioned above and FIG. 2. The INBOX and OUTBOX buttons of all of the subsystems and each subsystem which can be used by the user are displayed in the above screen. This display is performed on the basis of the connectable server list table 420 on the client. When the INBOX or OUTBOX button of a certain subsystem (server) is designated, the client obtains the address of the designated server from the server list table 420. When the client is at present connected to the server, the process corresponding to the designated button is started. When the client is not connected to the server, the connecting process is executed by using the obtained address and, after completion of the user authentication, the process corresponding to the designated button is started. In the basic screen 200, when the case input button 201 and the INBOX and OUTBOX buttons 211 and 221 of all of the subsystems are designated, the client sequentially connects to all of the servers in the connectable server list table 420, receives the user authentication, and executes the transmission and reception of the information and the processes. During the process, if there is a server which is not working, the process for this server is skipped.

(5) Effects

By constructing the system and the table arrangement as mentioned above, the client can obtain the list of the servers which can be used by the user from any server.

A service for accessing a plurality of servers can be provided to the user with a simple user interface.

It is sufficient to perform the change of the server, server address, and user in only the management server and the maintenance becomes simple.

(6) Modifications

Although the embodiment has been described with respect to the workflow system as an example, the defining method and distributing method of the information on the servers and users can be also applied to another multiserver systems.

The numbers of items in the tables of the subsystem list, user information, subsystem user information, user connection information, and connectable server list can be increased or decreased as necessary.

What is claimed is:

1. A multiserver workflow system comprising:
a plurality of servers;
a plurality of clients; and
a network to which said servers and said clients are connected, wherein:
each of said servers and users who use the clients construct a subsystem,
all of the servers contain address information of the servers constructing all subsystems and correspondence information of all users and the subsystems which can be used by respective users, and
when a client connects with any one of the servers, said client downloads a list of the subsystems which can be used by the user who uses said client and address information of the servers constructing usable subsystems from a connection server and stores the list of the subsystems as a connectable server list.

2. A system according to claim 1, wherein said client provides a user interface to access all of the usable subsystems with reference to said connectable server list and connects with the connection server constructing the subsystem selected by the user by using the address information in the connectable server list.

3. A system according to claim 1, wherein said client connects with the connection server by using the connectable server list and, when the connection to the connection server fails, said client proceeds to connect with another server in the connectable server list.

4. A multiserver workflow system according to claim 1, wherein said client is configured to first establish a connection with a default server so as to download the connectable server list therefrom and, when said default server is inoperable, to check the connectable server list as previously downloaded and automatically proceed to establish a connection with a first server listed in the connectable server list.

5. A multiserver workflow system according to claim 1, wherein said client is further configured to establish a connection with a second server listed in the connectable server list, when the connection with the first server results fails.

6. A multiserver workflow system according to claim 4, wherein said client is further configured to obtain update information pertaining to the servers available for workflow, when the connectable server list is downloaded from said default server.

7. A method of managing information on servers and users in a multiserver workflow system including a plurality of subsystems, comprising:
selecting an information management server from all servers in the multiserver workflow system;

at said information management server, defining subsystem/server address information including addresses of servers constructing all subsystems and user/subsystem correspondence information indicating a correspondence between all of the users and the subsystems which can be used by respective users for storage;

distributing subsystem/server address information and user/subsystem correspondence information from said information management server to all of the servers; and at each of the servers constructing the subsystems, storing said subsystem/server address information and said user/subsystem correspondence information distributed, extracting a list of subsystems which can be used by the user who uses said client and addresses of the servers constructing usable subsystems from stored information in response to a request from said client, and transmitting the list to said client.

8. A method according to claim 7, wherein at said information management server, information on all of the users is collected, a condition of the user constructing the subsystem is inputted, and said information on every user is compared with the condition of the user constructing said subsystem, the usable subsystem is determined for every user, and said user/subsystem correspondence information is made.

9. A method of connecting to a server by a client, comprising the steps of:

requesting, from a client, a connection with a default server, downloading a list of subsystems which can be used by a user who uses said client and addresses of all servers constructing usable subsystems from said default server, and storing the list of subsystems as a connectable server list; and establishing, from the client, the connection with a designated server in said connectable server list using said connectable server list at subsequent times, and when the connection with said designated server fails, proceeding, from the client, to connect with another server in said connectable server list.

10. A method according to claim 9, further comprising the step of:

when the connection with said default server succeeds, downloading the connectable server list from said default server in order to obtain update information.

11. A program storage device readable by a client machine, tangibly embodying a program of instructions executable by the client machine to perform method steps for connecting with a server machine, said method comprising the steps of:

requesting a connection with a default server, downloading a list of subsystems which can be used by a user who uses the client machine and addresses of servers constructing usable subsystems from the default server, and storing the list of subsystems as a connectable server list; and connecting with a designated server in said connectable server list using said connectable server list at subsequent times, and when the connection with said designated server fails, proceeding to connect with another server in said connectable server list.

12. A server/client system comprising:

a plurality of servers;

a plurality of clients; and a network to which said servers and said clients are connected, wherein each of the servers contains address information of all servers and correspondence information of all users and the servers which can be used by respective users, and when a client is connected to any one of the servers, said client downloads a list of servers which can be used by the user who uses said client and address information of the servers from a connection server and stores the list as a connectable server list.

13. A server/client system according to claim 12, wherein said client provides a user interface to access all of the usable subsystems with reference to said connectable server list and connects with the connection server constructing the subsystem selected by the user by using the address information in the connectable server list.

14. A server/client system according to claim 12, wherein said client connects with the connection server by using the connectable server list and, when the connection to the connection server fails, said client proceeds to connect with another server in the connectable server list.

15. A server/client system according to claim 12, wherein said client is configured to first establish a connection with a default server so as to download the connectable server list and, when said default server is inoperable, to check the connectable server list as previously downloaded and automatically proceed to establish a connection with a first server listed in the connectable server list.

16. A server/client system according to claim 15, wherein said client is further configured to establish a connection with a second server listed in the connectable server list, when the connection with the first server results fails.

17. A server/client system according to claim 15, wherein said client is further configured to obtain update information pertaining to the servers available for workflow, when the connectable server list is downloaded from said default server.

* * * * *